United States Patent

[11] 3,534,728

| [72] | Inventor | William F. Barrows<br>465 Calderon Apt. 3, Mountain View,<br>California 94040 |
|---|---|---|
| [21] | Appl. No. | 657,743 |
| [22] | Filed | July 31, 1967 |
| [45] | Patented | Oct. 20, 1970 |

[54] PHYSIOLOGICAL PARAMETER MEASURING SYSTEM
3 Claims, 6 Drawing Figs.

[52] U.S. Cl. ..................................................... 128/2.06,
73/339, 73/362, 325/113
[51] Int. Cl. ....................................................... A61b 5/04,
G01k 1/02, H04b 1/02
[50] Field of Search............................................ 128/2.06,
2.1, 2.1(5), 339T(Cursory); 73/344, 362(R)
362(T.Sc); 325/113, 118; 331/(Query); 340/345(B)

[56] References Cited
UNITED STATES PATENTS

| 3,158,027 | 11/1964 | Kibler............................ | 325/113UX |
| 3,212,496 | 10/1965 | Preston ......................... | 128/2.06 |
| 3,253,588 | 5/1966 | Vuilleumier et al. .......... | 325/113X |
| 3,273,066 | 9/1966 | Ruhnke ........................ | 325/113 |

OTHER REFERENCES

Nature, Q1.N2,Vol 179, June 15,1957, pages 1239,1240 copy in Gp. 335 128— 2.1(5) Electronics-Engineering Edition, Jan. 1958, pages 51— 53 copy in Gp.335 128— 2.1(5) Biomedical Telemetry Academic Press Inc., New York, N.Y. 1965, R895 C23C.2 pages 155 and 181— 185 copy in Gr. 335 Electro-Optical Systems. Inc.. Dec. 12. 1966 copy in Gp. 280 73 – 339(T)

*Primary Examiner*—Anton O. Oechsle
*Attorneys*—Darrell G. Brekke and G.T. McCoy ABSTRACT: A physiological parameter measuring system employs a single blocking oscillator whose pulse repetition frequency is simultaneously modulated by two parameters to be measured. One of the parameters varies the resistance of a temperature-sensitive resistor in the oscillator circuit, and the other parameter supplies a variable control input to the oscillator. The oscillator output is detected and the effects thereon of the two modulating parameters are separated to provide indications of these parameters.

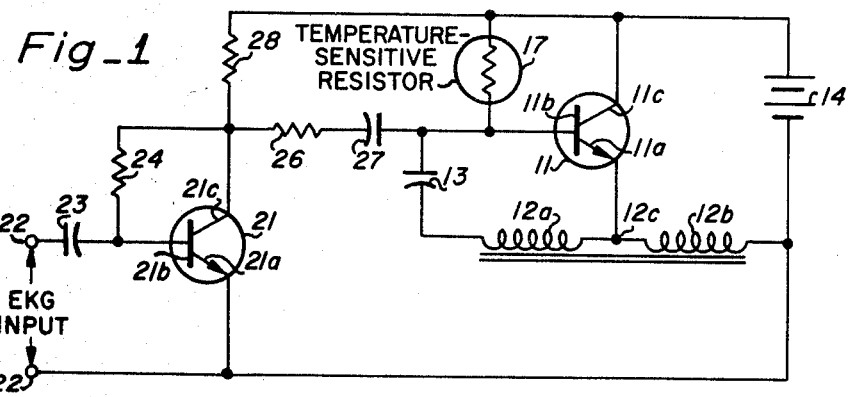
Fig_1
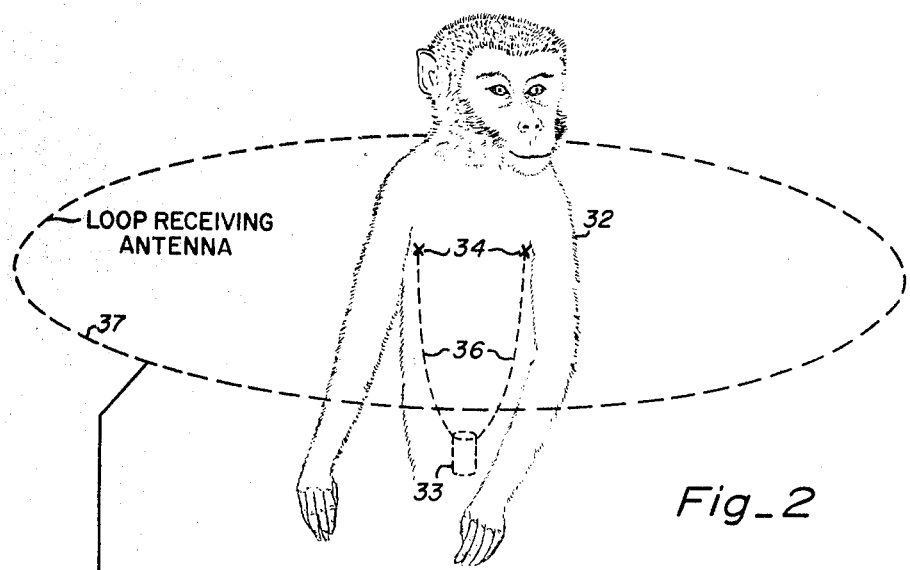
Fig_2
INVENTOR.
WILLIAM F. BARROWS
BY
ATTORNEYS

Patented Oct. 20, 1970
3,534,728
Sheet 2 of 2
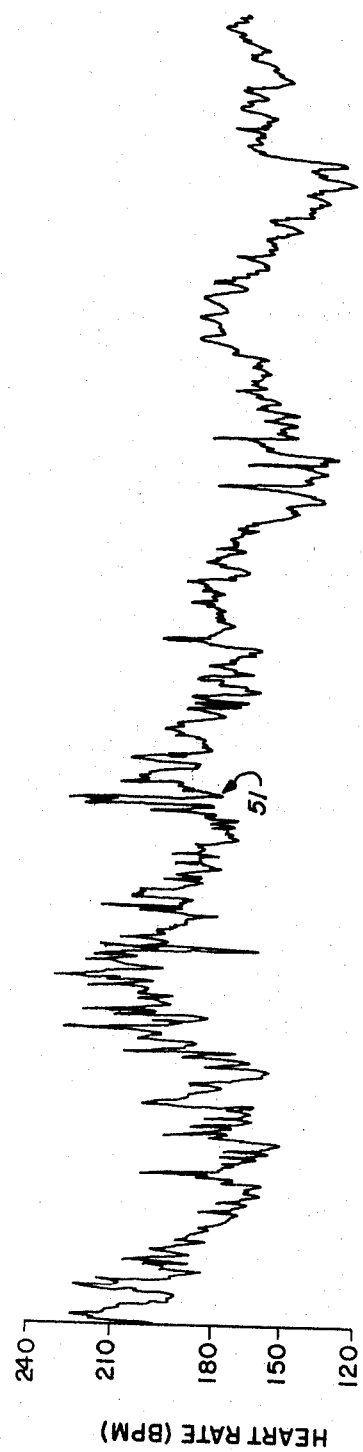
Fig. 3a
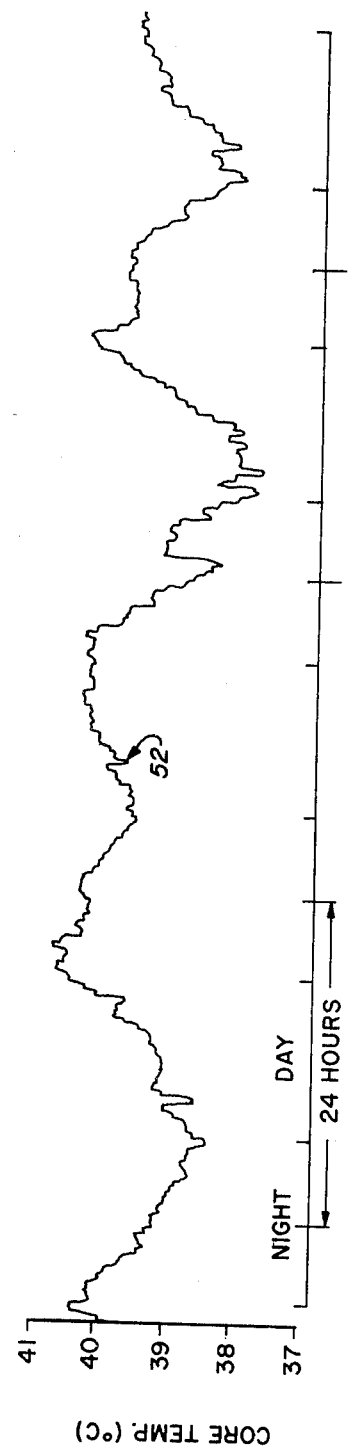
Fig. 3b
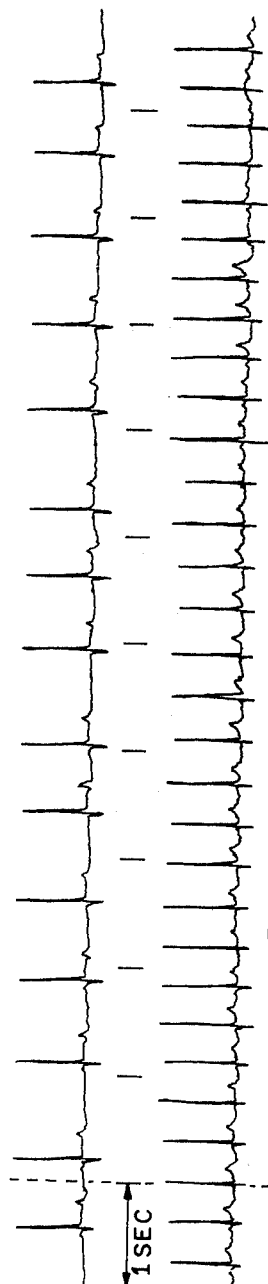
Fig. 4a
Fig. 4b
EKG AT LOW AND HIGH HEART RATES
INVENTOR.
WILLIAM F. BARROWS
BY
ATTORNEYS

3,534,728

PHYSIOLOGICAL PARAMETER MEASURING SYSTEM

BACKGROUND OF THE INVENTION

1. Field of the Invention

This invention relates in general to systems for measuring physiological parameters, and relates more particularly to such systems for measuring and transmitting the values of two of such parameters over a single information channel.

2. Description of the Prior Art

There has been considerable interest and activity in the field of the measurement and transmission of data relative to physiological parameters of humans and animals. This activity has been stimulated both by the space program, where it is necessary to determine the effects on animals of environmental conditions to be encountered in space, and by the needs of medicine to obtain data on physiological parameters in the diagnosis and treatment of illness.

It has been well-known for many years to implant transmitters in animal bodies for measuring a single parameter and transmitting information relative to the parameter value. Most of the prior art systems require a separate channel and receiving system for each implanted transmitter. However, where the available space is limited, as in small animals, and where only one channel of data may be obtained from a single transmitter, either the additional information which a second channel would provide must be sacrificed, or two smaller transmitters must be employed, with a consequent reduction in transmitter life because of the fact that the battery size is the largest single contributor to a transmitter's volume. If more than one transmitter is employed, then more than one receiving system must be employed to collect the transmitted data. Additionally, if switching or multiplexing is employed to transmit more than one channel of data from a single transmitter, there results an increase in size, complexity and cost not only of the transmitter itself but also of the receiving system.

It has been proposed in the art to utilize a single transmitter to transmit data as to two physiological parameters over a single channel by frequency modulating a continuous wave carrier as a function of the two parameters, and this system eliminates a number of the problems discussed above. However, this system still has the disadvantage that it requires the continuous generation of a carrier, with a consequent power drain on the limited batteries. Additionally, this prior art system modulates the carrier in response to the measured Electrocardiogram (EKG) signal and the respiration volume, and the superposition of signals corresponding to these two parameters on a single carrier will result in distortion of the EKG waveform, particularly at its low frequency components.

SUMMARY OF THE INVENTION

In accordance with this invention, there is provided a novel system for measuring two physiological parameters and simultaneously transmitting measures of these parameters over a single data channel, preferably employing an implanted transmitter or telemeter. In accordance with the preferred embodiment of this invention, a blocking oscillator is employed having a temperature-sensitive resistor in the oscillator circuit. This resistor is physically positioned so as to be responsive to the temperature of the animal in which the transmitter is implanted, so that variations in this temperature produce corresponding effects on the oscillator output. The blocking oscillator also receives a control input signal from an EKG sensing apparatus, and variations in this input signal also produce corresponding effects on the oscillator output.

Variations in the resistance of the temperature-sensitive resistor operate to vary the pulse repetition frequency (PRF), or length of time between bursts of oscillation, of the oscillator. Variations in the signal from the EKG sensor, which signal varies slowly relative to the PRF of the oscillator, operate to either speed up or slow down the PRF fairly rapidly about a mean rate which is determined by the temperature. The oscillator output is thus simultaneously modulated by both of the parameters being measured, and this output may be transmitted over a single channel to a receiver where the two information components may be extracted for recording or display. By using a blocking oscillator, a low duty cycle results so that there is a minimum drain on the power supply, thus increasing the life of the transmitter.

The transmitter of this invention is preferably housed in a container which is formed by cementing together the bottom halves of two glass bottles. This forms a rigid and highly moisture-resistant container which is not subject to the leakage problems often associated with prior devices potted in epoxy or paraffin.

It is therefore an object of this invention to provide an improved system for simultaneously transmitting data relative to the values of two physiological parameters over a single data channel.

It is a further object of the present invention to provide a system for simultaneously transmitting data relative to body temperature and EKG of an animal from a single transmitter implanted in the animal over a single data channel.

It is an additional object of this invention to provide a system for simultaneously transmitting data over a single channel relative to body temperature and EKG of an animal, the system employing a blocking oscillator having its pulse repetition frequency simultaneously modulated by both the body temperature and the EKG.

It is a further object of this invention to provide a blocking oscillator for transmitting data relative to the body temperature and EKG of an animal, in which a temperature-sensitive resistor is provided in the oscillator circuit for varying the oscillator pulse repetition frequency as a function of the body temperature, and a signal from an EKG sensor is simultaneously applied to the oscillator to vary the pulse repetition frequency.

It is an an additional object of the present invention to provide a transmitter to be implanted in an animal for transmitting data relative to physiological parameters, which transmitter is compact, sturdy, highly moisture-resistant, and requires a minimum of power.

Objects and advantages other than those set forth above will be apparent from the following description, when read in connection with the accompanying drawings, in which:

BRIEF DESCRIPTION OF THE DRAWINGS

FIG. 1 is a diagram of the circuit of the transmitter of this invention;

FIG. 2 illustrates one method of implanting the apparatus of this invention in an animal, together with a diagram of the preferred form of apparatus for receiving and recording the transmitted data;

FIGS. 3a and 3b are graphs obtained using the equipment of FIG. 2 showing the variations of temperature and heart rate in a laboratory animal; and FIGS. 4a and 4b are graphs obtained showing the heartbeat of a laboratory animal, utilizing the EKG information provided by this invention.

DESCRIPTION OF THE PREFERRED EMBODIMENT

Referring to FIG. 1, the transmitter of this invention employs a blocking oscillator which includes a transistor 11 having an emitter 11a, a base 11b and a collector 11c. Emitter 11a is connected to the junction 12c of a pair of inductive coils 12a, 12b. The other terminal of coil 12a is connected through a capacitor 13 to base 11b, while the other terminal of coil 12b is connected through a power source represented by battery 14 to collector 11c. A temperature-sensitive resistor 17 is connected across base 11b and collector 11c, and this resistor is physically positioned so as to be responsive to variations in the body temperature of the animal in which the transmitter is implanted.

The EKG signal is coupled to the blocking oscillator by means including a stage of amplification. Such amplification may be provided by a transistor 21 having an emitter 21a, a base 21b and a collector 21c. The EKG input signal appears at the amplifier input across a pair of terminals 22 from any suitable pair of EKG electrodes (not shown), and is coupled to transistor 21 through a capacitor 23. A resistor 24 is connected across base 21b and collector 21c. The output from transistor 21 is supplied to the blocking oscillator through a resistor 26 and a capacitor 27. A resistor 28 is connected between collector 21c and collector 11c.

In the operation of the circuit described thus far, blocking occurs because during oscillation, the sinusoidal voltage appearing across coil 12a is rectified by the base-emitter junction of transistor 11, resulting in a negative voltage buildup on the base (of transistor 11) side of capacitor 13. This negative voltage cuts transistor 11 off sharply and holds it off until enough current can flow through either resistor 17 or capacitor 27 to reverse the charge on capacitor 13. The length of time between bursts of oscillation will thus depend directly upon both the actual resistance of the temperature-sensitive resistor 17 and the current flow through capacitor 27. Since the resistance of resistor 17 varies as a function of the temperature of the animal in which the transmitter is implanted, it will be seen that the output of the oscillator is modulated by the animal temperature.

Similarly, since the current flow through capacitor 27 is a function of the EKG input signal, it will be seen that the output of the oscillator is also modulated by the EKG signal. This EKG signal, which varies slowly compared with the PRF of the transmitter, is then able to either speed up or slow down the PRF fairly rapidly about a mean rate which is determined by the animal temperature normally a very slowly varying parameter. The blocking oscillator output is thus simultaneously modulated by the two parameters to be measured, so that the oscillator output provides a measure of the values of both of the parameters. Neither form of modulation affects the "carrier" frequency, i.e., the resonant frequency of the antenna coil. Further, the duty cycle of such a circuit is quite low because of the blocking operation, making it an ideal choice for an extremely low current device (such as less than 5 microamperes in the preferred embodiment of the present circuit).

The transmitted signal from the oscillator may be received by any suitable receiver means, and one such receiving and recording system is shown in FIG. 2, together with a showing of one method of implanting the apparatus in an animal. Numeral 32 designates a monkey in which the transmitter of this invention is implanted. The portion of the transmitter shown in the circuit of FIG. 1 is mounted in a container 33, in a manner to be described more in detail below, and implanted in the peritoneal cavity of monkey 32 where resistor 17 is exposed to the body temperature of the animal. The EKG electrode tips 34, which sense the EKG signal, may be affixed to periosteal tissue on the ribs, and these tips are connected to the input represented by terminals 22 in FIG. 1 through subcutaneous electrodes 36.

The signal generated by the transmitter in container 33 may be received by means of a loop antenna 37 surrounding monkey 32. When the circuit components to be described below are utilized in the circuit of FIG. 1, the signal transmitted therefrom may be received at a number of frequencies on any standard AM broadcast radio. This wide spectrum is due to the fact that the output is pulsed rather than purely sinusoidal and is thus rich in harmonics. The receiving apparatus may thus include an AM receiver 38 coupled to antenna 37 and having its output which appears across the volume control terminals supplied to a frequency demodulator 39. The output of demodulator 39 is supplied to a recording device generally indicated by the dotted enclosure 41. Preferably, this recorder includes two channels for separately recording the temperature and EKG variations. One such channel includes AC coupling means 42 through which the output signal of demodulator 39 is supplied to an EKG recorder portion 43. The output of demodulator 39 is also supplied to a second channel which includes DC coupling and filtering means 46 and a temperature recorder 48. This DC coupling and filtering is necessary to remove the relatively high frequencies of the EKG signal so that only the temperature signal may be seen.

If a direct plot of the heartbeat rate is desired, the EKG signal produced in accordance with this invention may be processed through a conventional pulse rate-to-voltage converter 49 and supplied to a heart rate recorder 50.

Graphs of the recorded signals obtained over a period of several days utilizing apparatus as shown in FIG. 2 are presented in FIGS. 3a and 3b. Curve 51 of FIG. 3a represents the heart rate obtained on recorder 50, while curve 52 represents the temperature signal. Corresponding portions of the curves are aligned vertically, and the correspondence between the basic shapes of the two curves can be clearly seen, indicating that the output of the blocking oscillator is capable of conveying information as to both temperature and EKG over a single channel.

Tracings of EKG signals obtained for a period of low heartbeat rate are shown in FIG. 4a, and for a period of higher heartbeat rate in FIG. 4b. In these tracings, each spike represents one heartbeat, and they are plotted on the time scale shown.

Referring again to the circuit of FIG. 1, the following circuit components and component values have been found to produce a highly satisfactory operation.

Battery 14—1.35 volt mercury cell, type RM 625.
Transistors 11 and 21—High beta silicon, type 2N3565.
Temperature-sensitive resistor 17—5 megohms at 25°C.
Coils 12a and 12b—Approximately 150 turns each, wound in the same direction and closely coupled. If air core, ≅ ¾ inch diameter; if ferrite core, three-eighth inch diameter, one-half inch long.
Capacitor 13—680 picofarads.
Capacitors 23 and 27—1.0 microfarads (low leakage of less than $10^{-8}$ ampere at 1 volt).
Resistors 26 and 28—470 kilohms.
Resistor 24—22 megohms.
Utilizing the above component types, the temperature measuring section of the apparatus has a range from +10°C to 50°C, with a repeatable resolution of ±0.1°C. The EKG section has an input impedance of 500 kilohms and has a frequency response from 0.3 Hz to 100 Hz. The common mode rejection was infinite with respect to earth ground, because of the r.f. link, and the input noise was less than 50 microvolts peak-to-peak.

In the preferred method of assembling the components in container 33, the bottom halves are sawed off two identical small glass bottles and the circuit components placed inside one of these bottoms. The radiating antenna should be located in the other bottom as far as possible from the metal-encased battery to minimize loading of the transmitted signal. Resistor 17 should be cemented to the inner surface of the glass to improve the speed of response of the temperature sensing portion of the circuit. After placing the components in the bottom of the one bottle, the other bottle bottom is cemented thereto with a highly moisture-resistant epoxy (such as ECCO Stycast 3180-M) to form a rigid and extremely watertight container. The EKG leads may be brought out through two small grooves filed radially in the top edge of one of the bottle bottoms. A medical grade silastic may be smoothed over the epoxy junction between the two bottle bottoms to prevent any tissue reaction when the unit is implanted inside an animal.

Although the illustrated embodiment is related to the recording of EKG data, it will be apparent that other types of data may be recorded, such as an Electromyogram, an Electrooculogram or an Electroencephalogram. In an even broader sense, it will be seen that the circuit of this invention is useful whenever it is desired to monitor a resistance and a voltage change and to transmit information as to these changes over a single data channel.

While the above detailed description has shown, described and pointed out the fundamental novel features of the invention as applied to various embodiments, it will be understood that various omissions and substitutions and changes in the form and details of the device illustrated may be made by those skilled in the art, without departing from the spirit of the invention. It is the intention, therefore, to be limited only as indicated by the scope of the following claims.

I claim:

1. A telemeter for transmitting data relative to the physiological parameters temperature and EKG comprising:

a blocking oscillator for transmitting bursts of energy at a substantially constant carrier frequency;

a temperature-sensitive resistor connected to said oscillator, the resistance of said resistor varying as a function of said temperature parameter, said variations causing a first modulation of the pulse repetition frequency of said oscillator;

an amplifier having two input terminals and an output;

an EKG electrode connected to each of said input terminals;

means for coupling said output of said amplifier to said blocking oscillator, the output of said amplifier causing a second and simultaneous modulation of said pulse repetition frequency of said oscillator, said second modulation being a function of the EKG signals sensed by said EKG electrodes.

2. Apparatus for telemetering data relative to the physiological parameters temperature and EKG comprising:

a blocking oscillator for transmitting bursts of energy at a substantially constant carrier frequency, said oscillator including a first transistor having a base, an emitter, and a collector, a first coil and a second coil, a first capacitor connected in series with said first coil across said base and said emitter, a DC voltage source connected in series with said second coil across said emitter and said collector;

a temperature-sensitive resistor connected across said base and said collector, the resistance of said resistor varying as a function of said temperature parameter, said variations causing a first modulation of the pulse repetition frequency of said oscillator;

a second transistor having a base, emitter and a collector;

first and second EKG electrodes for measuring said EKG parameter, said first electrode being connected to said emitter of said second transistor;

a second capacitor connected between said second EKG electrode and said base of said second transistor;

a first resistor connected between said base and said collector of said second transistor;

a second resistor connected between said collector of said second transistor and said collector of said first transistor;

a third resistor and a third capacitor connected in series between said collector of said second transistor and said base of said first transistor;

the signals passing through said third capacitor to said blocking oscillator being a function of said EKG parameter, said signals causing a second and simultaneous modulation of said pulse repetition frequency of said oscillator.

3. Apparatus in accordance with claim 2 including receiving means for receiving said transmitted energy;

a demodulator having an input and first and second outputs;

an EKG recorder;

AC coupling means for coupling said EKG recorder to said first output;

a temperature recorder; and

DC coupling and filter means for coupling said temperature recorder to said second output.